United States Patent
diGirolamo et al.

(10) Patent No.: US 7,533,508 B1
(45) Date of Patent: May 19, 2009

(54) CONNECTOR FOR CONNECTING BUILDING COMPONENTS

(75) Inventors: Edward R. diGirolamo, Raleigh, NC (US); Michael L. Torres, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 1511 days.

(21) Appl. No.: 10/095,411

(22) Filed: Mar. 12, 2002

(51) Int. Cl.
*E04C 5/12* (2006.01)

(52) U.S. Cl. .................. 52/481.1; 52/712; 52/293.9; 52/241; 248/903; 248/300; 403/403; 403/231

(58) Field of Classification Search ............... 52/481.1, 52/282.4, 702, 281, 285.1 V, 293.3 V, 299, 52/357, 489.1, 506.06, 701, 715, 745.21, 52/712, 746.1, 241, 282.3; 248/903, 300; 403/403, 231, 2, 232.1, 205; 312/257.1, 312/263, 351, 334.36
See application file for complete search history.

(56) References Cited

U.S. PATENT DOCUMENTS

| | | | | |
|---|---|---|---|---|
| 491,091 A * | 2/1893 | Drake | .................. | 248/300 |
| 625,427 A * | 5/1899 | Stewart et al. | .............. | 403/190 |
| 773,207 A * | 10/1904 | Kaiser | .................. | 248/903 |
| 874,514 A * | 12/1907 | Lindow | .................. | 403/190 |
| 4,013,253 A * | 3/1977 | Perrault et al. | ........... | 248/223.3 |
| 4,024,685 A * | 5/1977 | Aarons | .................. | 52/278 |
| 4,047,353 A * | 9/1977 | Aarons | .................. | 52/713 |
| 4,192,118 A * | 3/1980 | Gilb | ...................... | 52/714 |
| 4,261,593 A * | 4/1981 | Yeager | .................. | 280/415 R |
| 4,330,974 A * | 5/1982 | Fleisch et al. | .................. | 52/486 |
| 4,665,672 A * | 5/1987 | Commins et al. | ............. | 52/295 |
| 4,691,491 A * | 9/1987 | Lilley | ...................... | 52/22 |
| 4,825,621 A * | 5/1989 | Jensen | .................. | 52/702 |
| 4,920,725 A * | 5/1990 | Gore | ...................... | 52/702 |
| 5,042,615 A * | 8/1991 | Anderson | .................. | 182/136 |
| 5,092,097 A * | 3/1992 | Young | .................. | 52/702 |
| 5,218,803 A * | 6/1993 | Wright | .................. | 52/243 |
| 5,467,570 A * | 11/1995 | Leek | ...................... | 52/712 |
| D375,038 S * | 10/1996 | Trevorrow | .................. | D8/354 |
| 5,664,392 A * | 9/1997 | Mucha | .................. | 52/715 |
| 5,794,395 A * | 8/1998 | Reed | ...................... | 52/298 |
| 5,813,182 A * | 9/1998 | Commins | .................. | 52/295 |
| 5,885,024 A * | 3/1999 | Zupan et al. | ............... | 403/389 |

(Continued)

FOREIGN PATENT DOCUMENTS

GB 2063329 * 6/1981 ................. 52/712

(Continued)

*Primary Examiner*—Phi Dieu Tran A
(74) *Attorney, Agent, or Firm*—Coats & Bennett, P.L.L.C.

(57) ABSTRACT

A connector or clip is provided for connecting a metal stud or other member to a support structure. The connector or clip includes a connecting plate for connecting to the stud or other member. A base plate extends from the connecting plate and is adapted to mount to the support structure. A juncture or fold line is defined between the connecting plate and the base plate. One or more ribs are formed in the base plate and extend generally perpendicular to the juncture. In one embodiment, an upturned edge is formed along one side of the base plate opposite the juncture. Further, a reinforcing member is adapted to be secured to the base plate such that both the base plate and reinforcing member can be secured to an adjacent support surface or structure via a connecting fastener.

1 Claim, 5 Drawing Sheets

U.S. PATENT DOCUMENTS

| | | | |
|---|---|---|---|
| 5,979,130 A * | 11/1999 | Gregg et al. | 52/295 |
| 6,250,041 B1 * | 6/2001 | Seccombe | 52/712 |
| 6,513,290 B2 * | 2/2003 | Leek | 52/295 |
| 2002/0000070 A1 * | 1/2002 | VeRost et al. | 52/295 |
| 2002/0020135 A1 * | 2/2002 | Grove, Jr. et al. | 52/702 |
| 2002/0020137 A1 * | 2/2002 | Commins | 52/712 |
| 2002/0121066 A1 * | 9/2002 | Callahan et al. | 52/713 |
| 2003/0009980 A1 * | 1/2003 | Shahnazarian | 52/712 |

FOREIGN PATENT DOCUMENTS

| | | | | |
|---|---|---|---|---|
| GB | 2132073 | * | 7/1984 | 52/712 |
| JP | 57830 | * | 3/1994 | 52/295 |

* cited by examiner

CONNECTOR FOR CONNECTING BUILDING COMPONENTS

FIELD OF THE INVENTION

The present invention relates to metal connectors and more particularly to a connector for connecting a metal building stud to an underlying or overlying support structure.

BACKGROUND OF THE INVENTION

In recent years, cold-formed steel framing for both residential and commercial applications has grown at a tremendous rate. Today, engineers, architects and contractors appreciate that light steel framing is a better value than more traditional materials such as masonry or wood.

Light steel framing is ideal for floors, roofs, support structures for finishes, non-load bearing walls, and even load-bearing walls up to approximately nine stories. With wall systems, whether they are load-bearing or non load-bearing, it is customary to use connectors or clips to secure individual metal studs to overlying and/or underlying support structures. Various connector or clip designs are known. For example, it is known to use simple L-shaped connector designs to interconnect metal studs with an underlying or overlying floor structure, for example. However, typical L-shaped connectors may not necessarily handle the variety of loads and forces that are sometimes experienced where studs are joined or secured to a floor or other support structure. More particularly, conventional connector designs may not always efficiently and effectively resist uplift, horizontal and rotational loads that are experienced about connecting points between such studs and an adjacent support structure.

Therefore, there has been and continues to be a need for a more heavy duty and durable connector for connecting metal studs to floors and other adjacent support structures that will effectively resist uplift, horizontal and rotational loads.

SUMMARY OF THE INVENTION

The present invention entails a connector that is adapted to connect a vertical member such as a metal stud to an adjacent support structure. The connector includes a connecting plate for connecting to the vertical building member or stud and a base plate extending from the connecting plate at a selected angle. The base plate is in turn adapted to connect to an adjacent support structure such as, for example, an underlying concrete floor. A juncture is defined between the connecting plate and the base plate. Finally, a series of spaced apart ribs are formed in the base plate and extend generally perpendicular to the juncture.

In another embodiment of the connector of the present invention, the connector is provided with an upturned flange that extends along one side of the base plate opposite the juncture. Further, in another embodiment, the connector is provided with a reinforcing member or block that extends over the base plate. In one particular design, the reinforcing member is tightly secured adjacent the base plate so as to reinforce the base plate and impart sufficient strength to generally prohibit the base plate from bending or being deformed in the case of certain loads being applied to the connector.

In yet another embodiment of the present invention, when the reinforcing member or block is incorporated into the connector, the reinforcing member or block is provided with a series of rib recesses that receive and mate with the ribs of the base plate. In some cases, the reinforcing member or block may be glued to the base plate.

A series of fasteners may be used to securely fasten the connector to both a stud and to an adjacent support structure. Where the connector is placed over a concrete floor, for example, a lag screw can be extended through the base plate and into the concrete floor to secure the connector to the underlying support structure. A series of screws or other type of fasteners can be extended through openings formed in the connecting plate so as to secure the connecting plate to the web of an adjacent stud.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, the connector of the present invention is shown therein and indicated generally by the numeral 10. As will be appreciated from subsequent portions of the disclosure, connector 10 is adapted to be used in a building construction assembly and while the connector 10 may be utilized in different ways, in one exemplary embodiment the connector 10 is utilized to fasten or connect metal building studs to an underlying or overlying support structure.

Figure 1A:
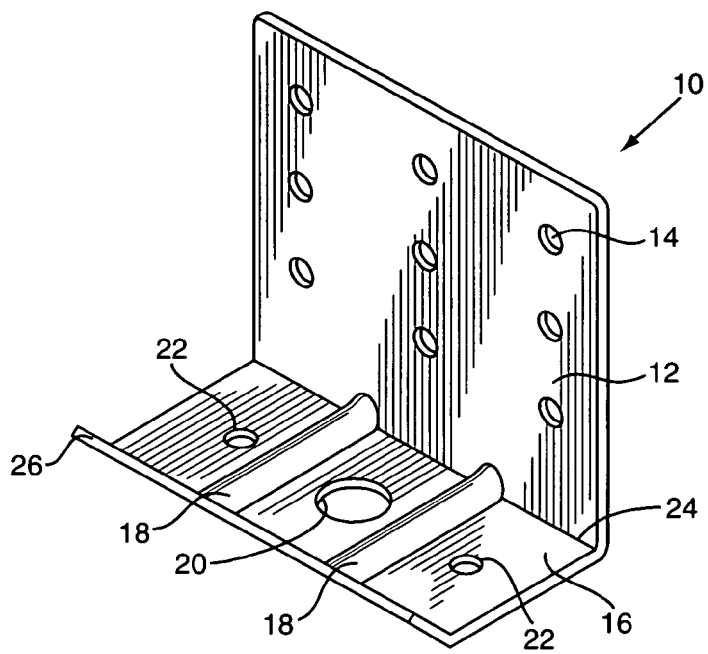
FIG. 1A is a perspective view of the connector of the present invention.
Figure 1B:
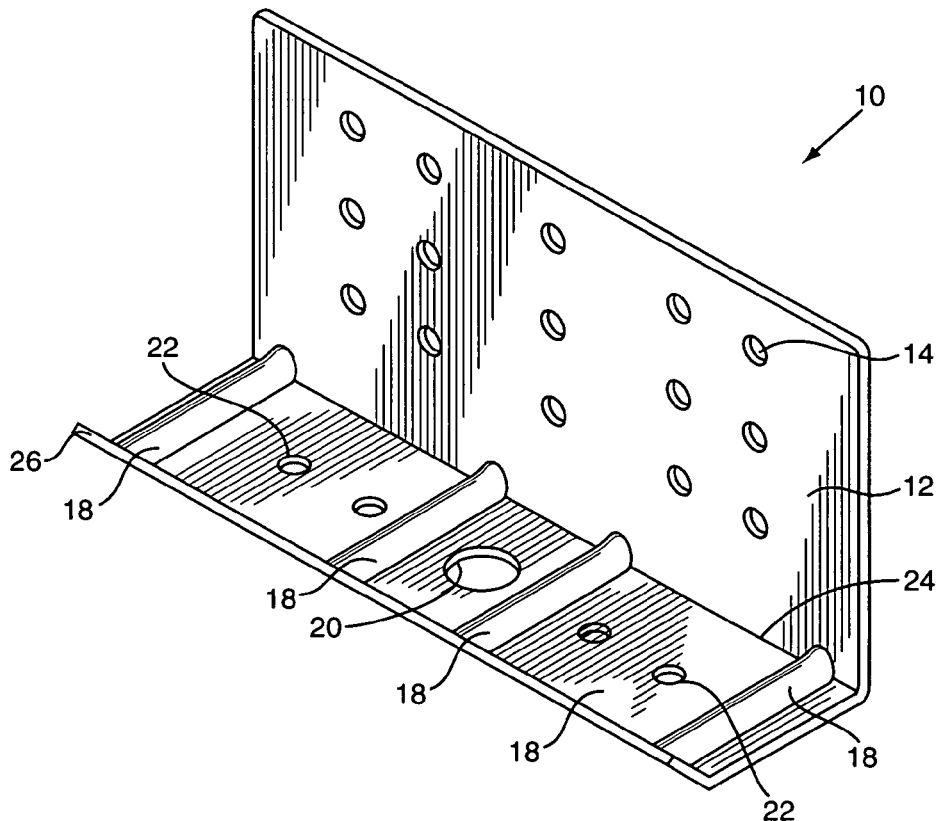
FIG. 1B is a perspective view of the connector of the present invention showing a somewhat wider embodiment that that shown in FIG. 1A.

Turning to a description of the connector 10, as seen in FIGS. 1A and 1B, the connector 10 includes a connecting plate 12. The connecting plate 12 includes a series of openings 14 that are designed to receive fasteners such as screws or bolts that act to secure the connector 10 to a vertical support member such as a building stud indicated generally by the numeral 50 in FIGS. 3 and 4.

Extending from the connecting plate 10 is a base plate 16. Base plate 16 includes a series of reinforcing ribs 18. The reinforcing ribs 18 extend generally perpendicular to a juncture or fold line indicated by the numeral 24. Further, base plate 16 includes one or more openings that enable fasteners to be extended downwardly through the base plate 16 so as to secure the entire connector 10 to an underlying structure such as a concrete floor, for example. In the case of the embodiments illustrated in FIGS. 1A and 1B, the openings formed in the base plate 16 include one central opening 20. In cases of both embodiments shown in FIGS. 1A and 1B, the central opening 20 is disposed generally centrally within the base plate 16 and between two ribs 18 that are disposed about a central area of the base plate 16. As will be appreciated from subsequent portions of the disclosure, central opening 20 is designed to enable a lag screw of substantial size to be extended downwardly through the opening for engagement with an underlying support structure. Such a lag screw, if used, will securely anchor the entire connector 10 to the underlying support structure. In addition, the base plate 16 includes one or more openings 22. Openings 22 in the case of the embodiments illustrated are somewhat smaller than the central opening 20. However, the size of all the openings can vary depending upon design and application. In any event, openings 22 are suitable for receiving other elongated fasteners such as screws or bolts that would be used also to secure and anchor the entire connector 10 to an underlying or overlying support structure such as a floor structure or beam.

Also comprising a part of connector 10 is an upturned flange 26. Note that upturned flange 26 extends from the base plate 16 opposite the juncture 24. The upturned flange can be formed by bending an edge portion of the base plate 16 upwardly. Alternatively, the upturned flange 26 can be a separate element or component and can be secured to the base plate 16 by weldment or suitable means.

Figure 2A:
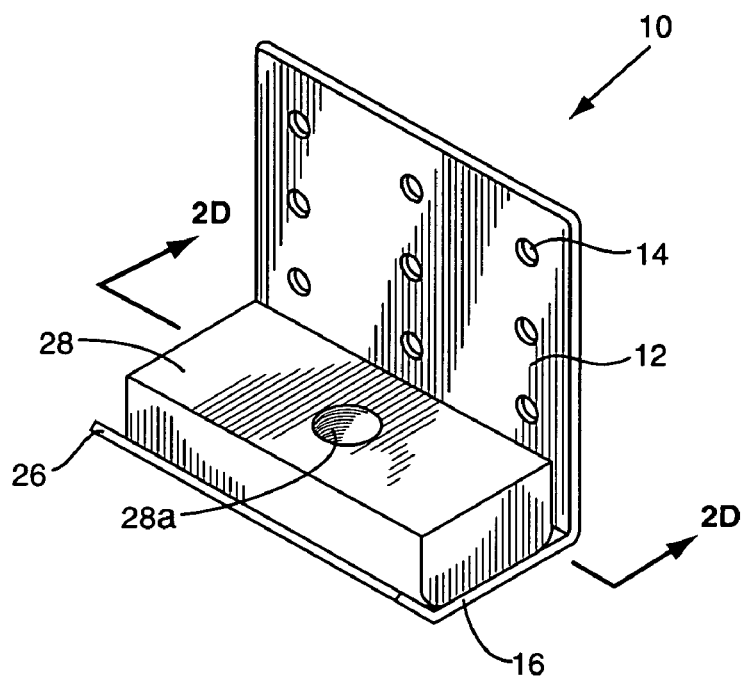
FIG. 2A is a perspective view of an alternate embodiment of the present invention.
Figure 2B:
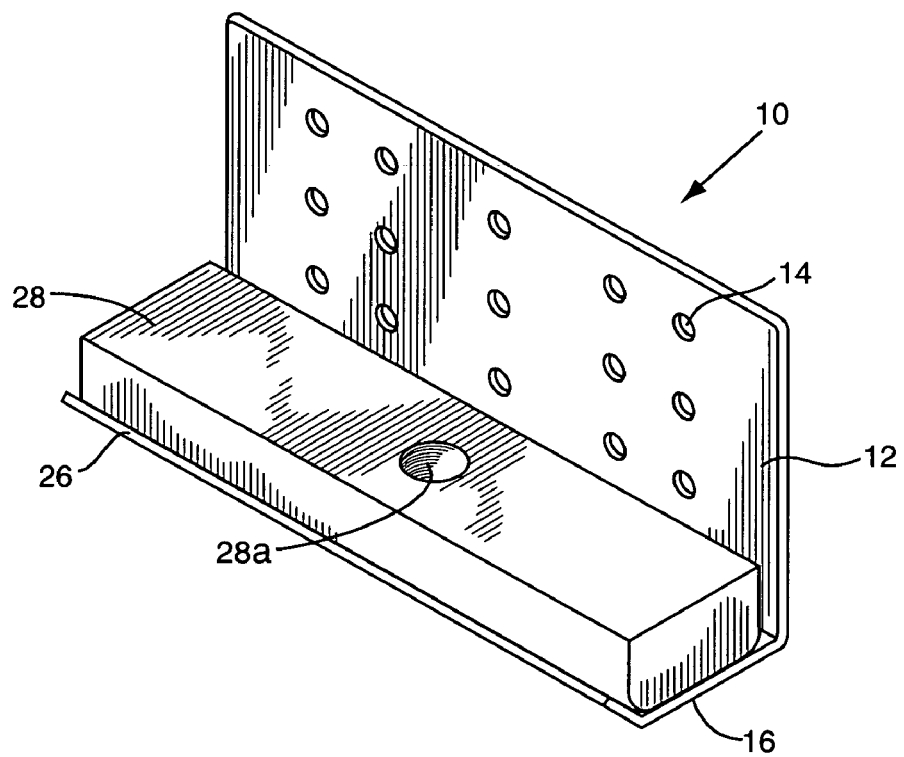
FIG. 2B is a perspective view of the connector of the present invention showing a somewhat wider embodiment than that shown in FIG. 2A.
Figure 2C:
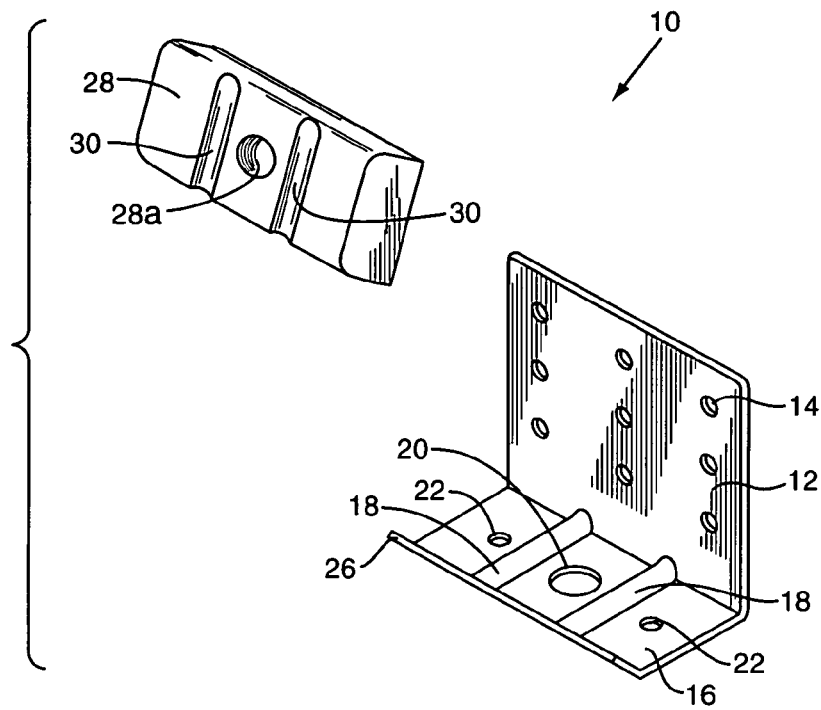
FIG. 2C is an exploded view of the connector showing the reinforcing member rotated so as to show the recesses formed on the bottom surface thereof.

Turning to FIGS. 2A and 2B, another embodiment of the connector 10 is shown therein. Basically the structure of the connector 10 as shown in FIGS. 2A and 2B conforms generally to the structure of the connector shown in FIGS. 1A and 1B. However, in the case of the embodiment illustrated in FIGS. 2A and 2B, there is provided, in addition to the structure already discussed, a reinforcing member or block 28. Reinforcing member or block 28 extends transversely over the top surface of the base plate 16. As shown in FIGS. 2A and 2B, when the connector includes an upturned flange 26, the reinforcing member 28 is generally confined or cradled between the upturned flange 26 and the connecting plate 12.

Formed centrally within the reinforcing member 26 is a central opening 28a that would align with the central opening 20 formed in the base plate 16. In addition, if additional fasteners are needed to secure the connector 10 to an underlying support structure, the reinforcing member 28 can be provided with additional openings that would align with other openings, such as openings 22, formed in the base plate 16.

About the underside of the reinforcing member 28, there may be provided a series of grooves or notches that are referred to as recesses 30. These recesses 30 are designed to receive and mate with the ribs 18 shown in FIGS. 1A and 1B. In the case of the embodiment shown in FIG. 2A, the underside of the reinforcing member 28 would be provided with two elongated recesses for receiving and mating with the two ribs 18 shown therein. Likewise, in the case of an embodiment such as shown in FIGS. 1A and 2B, the reinforcing member 28 would be provided with a series of four rib recesses 30.

Figure 2D:
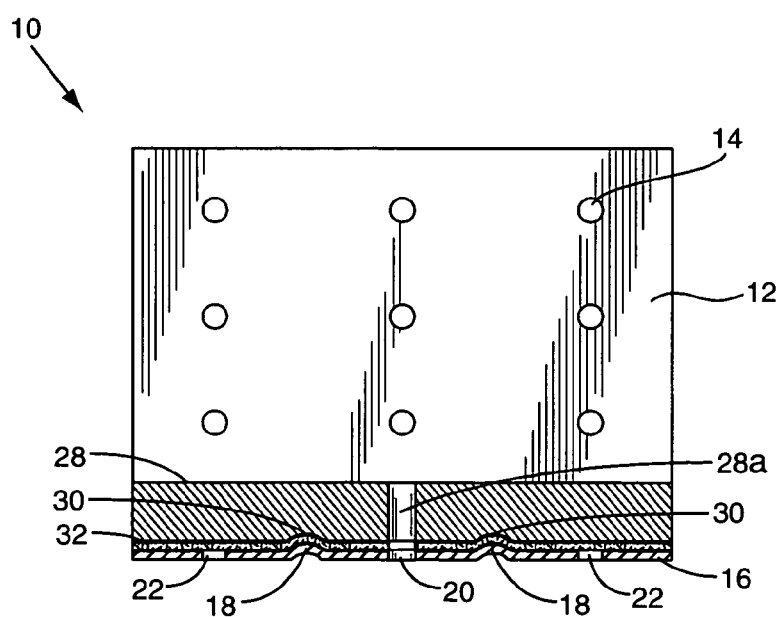
FIG. 2D is a cross-sectional view of the embodiment shown in FIGS. 2A and 2B taken through the line 2D-2D, and particularly illustrating that the reinforcing member could be secured to the base plate by an adhesive layer.

The reinforcing member of block 28 may in some embodiments be secured to the underlying base plate 16. For example, as indicated in FIG. 2D, the reinforcing member 28 is secured by an adhesive layer 32 to the underlying base plate 16.

In use, the connector 10 of the present invention may be used in various ways in building construction to secure one component to another component. In the way of an example, the connector 10 can be utilized to connect a stud, indicated generally by the numeral 50 in FIGS. 3 and 4 to an underlying or overlying support structure such as a floor, beam, etc. As shown in the drawings, the studs 50 are generally of the metal type and include a central web 52 flanked by a pair of flanges 54. Also, it is appreciated that in typical metal building construction that a U-shaped channel is often used as an interface between the studs 50 and an upper or lower support structure. In this regard, note in FIGS. 3 and 4 where there is provided an elongated channel indicated generally by the numeral 60 that receives opposed ends of the studs 50. Each channel 60 includes a central web 62 and a pair of flanges 64.

Figure 3:
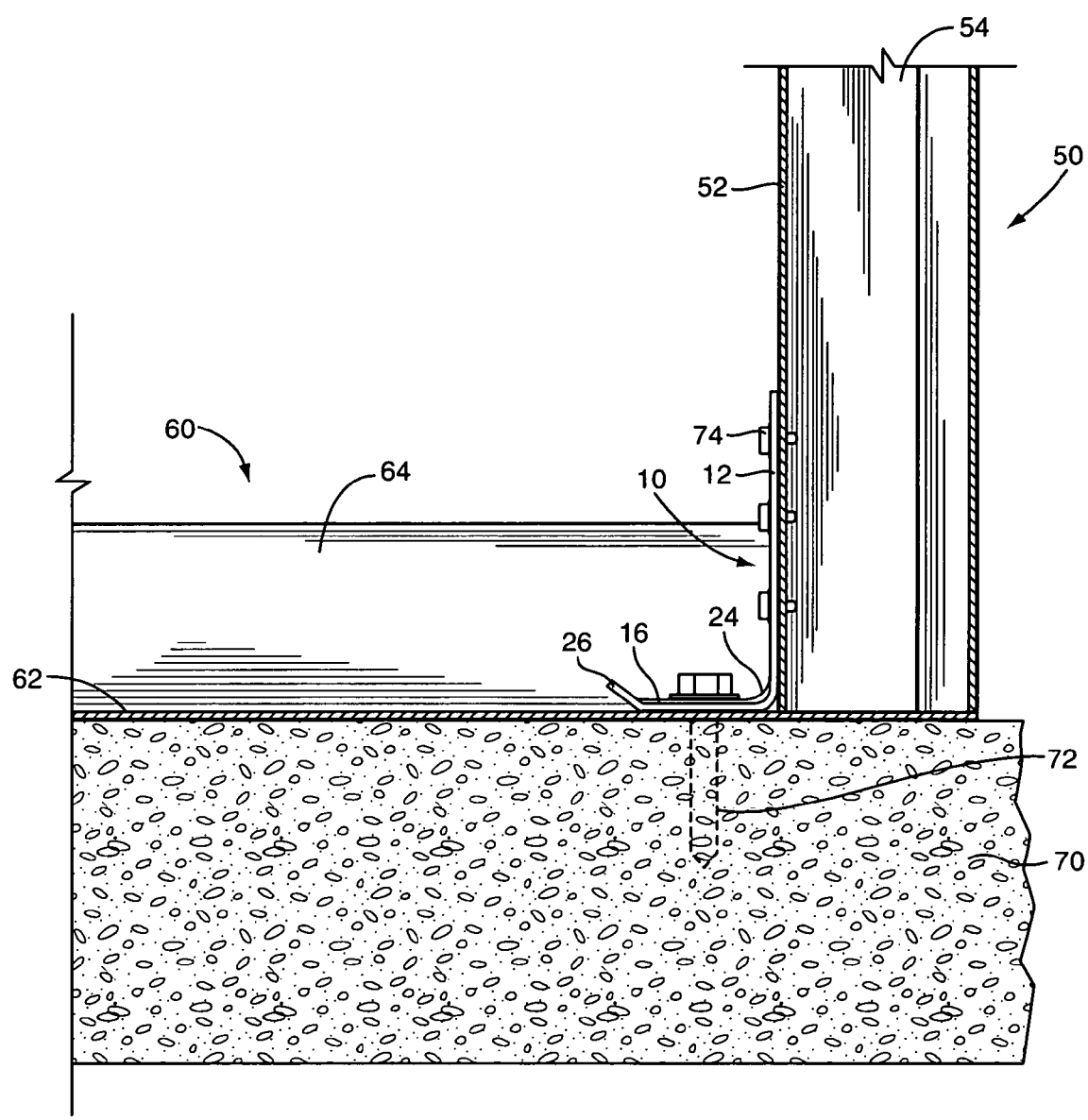
FIG. 3 is a fragmentary sectional view showing the connector of the present invention connecting a metal building stud to a lower channel and to an underlying concrete floor.

FIG. 3 shows in section the use of the connector 10 to connect a stud 50 to the channel 60. Note the provision of the underlying support structure 70 that supports the channel 60. In the embodiment illustrated in FIG. 3, a concrete floor section indicated by the numeral 70 underlies the channel 60 and supports both the channel 60 and the various studs 50 that extend upwardly from the channel 60. Also a lag screw 72 extends downwardly through the base plate 16 into the underlying concrete floor 70. Further, a series of screws or other fasteners 74 extend through the openings 14 formed in the connecting plate 12 and connect the connecting plate to the web 52 of the stud 50.

Figure 4:
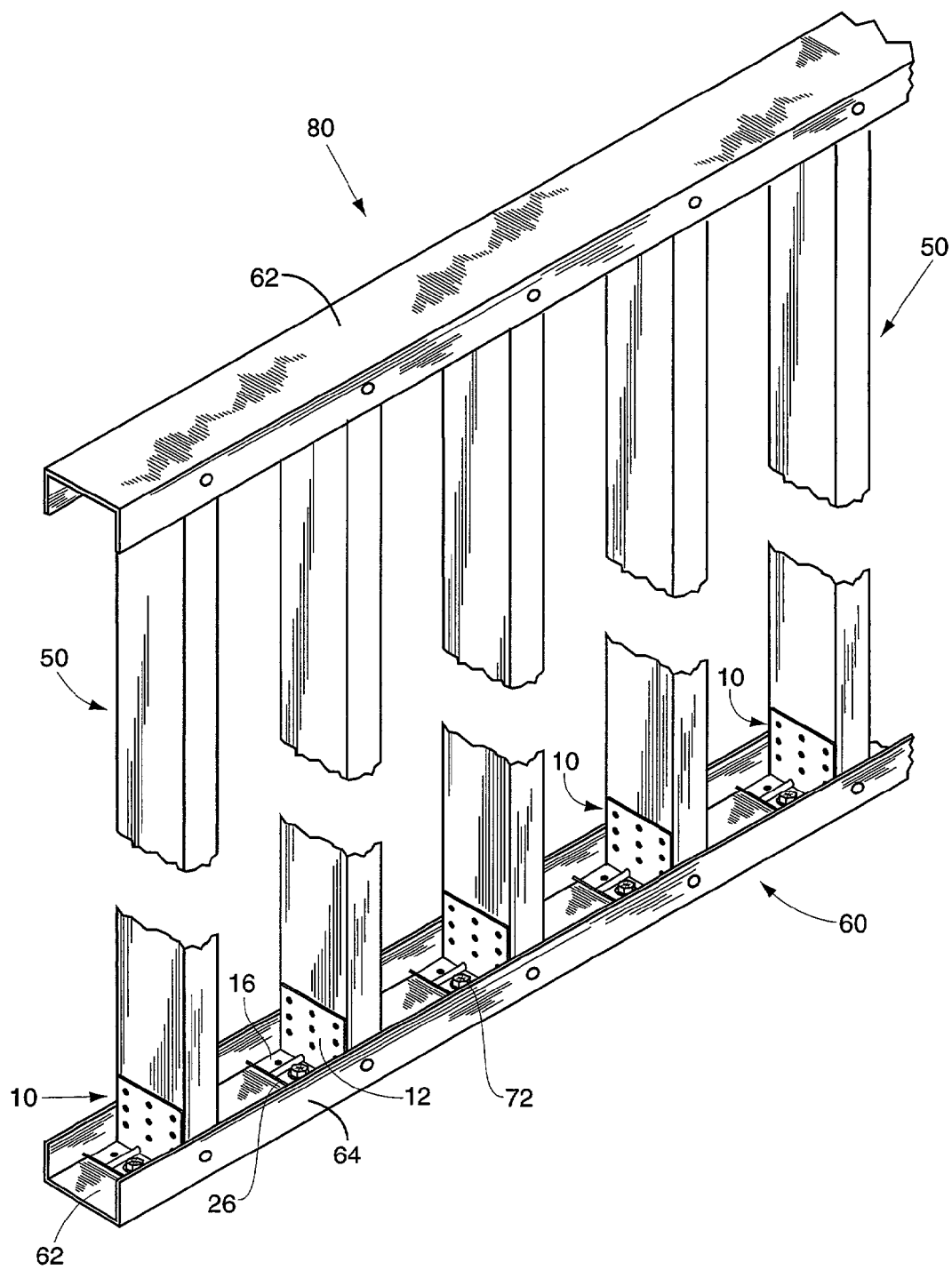
FIG. 4 is a perspective view of a wall section having connectors of the present invention incorporated therein.

Turning briefly to FIG. 4, there is shown therein a wall section indicated generally by the numeral 80. In this case, the wall section includes upper and lower channels 60 joined by a series of spaced apart studs 50. The connectors 10 of the present invention are specifically shown connecting the lower end portions of the studs 50 the lower channel 60. However, it is appreciated that the same connectors can be utilized by the upper portions of the studs 50 to connect the studs to the upper channel 60. Finally, both channels 60 would be disposed, in a typical application, adjacent a support structure such as a concrete floor, beam, etc. Therefore, the lag screw 72 extending through the base plate 16 of each connector would also extend into and connect to such an adjacent support structure.

The connector 10 of the present invention has numerous advantages. It is designed for strength and rigidity. In particular, it is designed to form a firm and rigid heavy duty connection between the opposed end portions of the studs 50 and any adjacent connected supporting structure.

The design of the connector including the ribs 18, the upturned flange 26 and the reinforcing member 28, enables the connector 10 to resist uplifting, horizontal and rotational loads that might be applied directly to or transferred to the connecting points where the studs 50 connect to the underlying or overlying channels and to the adjacent supporting structure.

Connector 10 may be constructed of various materials but it is contemplated that in one embodiment the connector would be constructed of metal. The embodiment illustrated herein is formed from a single metal piece by an appropriate stamping operation. Other fabrication methods could be used. The thickness or gauge of the material utilized for the connector can vary to suit various types of applications.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A metal wall section, comprising:
   a series of spaced apart metal studs with each stud having opposed end portions;
   at least one support surface disposed adjacent one end portion of the studs;

a series of stud connector for securing the studs to the support surface;

each stud connector including:
  a connecting plate for connecting to a stud;
  a base plate extending from the connecting plate at a selected angle and connected to the support surface;
  a juncture defined between the connecting plate and the base plate;
  a series of spaced apart ribs formed on the base plate and extending generally perpendicular to the juncture;
  a reinforcing member disposed over the base plate;
  an adhesive interposed between the reinforcing member and the base plate for securing the reinforcing member to the base plate.

* * * * *